(12) United States Patent
Hanchett

(10) Patent No.: US 11,699,972 B2
(45) Date of Patent: Jul. 11, 2023

(54) VARIABLE SPEED MOTOR DRIVE WITH INTEGRATED MOTOR HEATING SYSTEMS AND METHODS

(71) Applicant: Johnson Controls Technology Company, Auburn Hills, MI (US)

(72) Inventor: Samuel A. Hanchett, Shrewsbury, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 504 days.

(21) Appl. No.: 16/549,181

(22) Filed: Aug. 23, 2019

(65) Prior Publication Data

US 2020/0067447 A1 Feb. 27, 2020

Related U.S. Application Data

(60) Provisional application No. 62/722,481, filed on Aug. 24, 2018.

(51) Int. Cl.
| | |
|---|---|
| *H02P 3/00* | (2006.01) |
| *H02P 29/64* | (2016.01) |
| *H02P 29/62* | (2016.01) |
| *G06F 13/40* | (2006.01) |
| *G06F 1/3206* | (2019.01) |
| *H02P 29/68* | (2016.01) |

(52) U.S. Cl.
CPC ............ *H02P 29/64* (2016.02); *G06F 1/3206* (2013.01); *G06F 13/4077* (2013.01); *H02P 29/62* (2016.02); *H02P 29/68* (2016.02); *H02P 2201/09* (2013.01)

(58) Field of Classification Search
CPC .......... H02P 29/68; H02P 29/62; H02P 29/64; H02P 2201/09; G06F 1/3206; G06F 13/4077; Y02D 10/00
USPC ......................................................... 318/473
See application file for complete search history.

(56) References Cited

U.S. PATENT DOCUMENTS

| | | |
|---|---|---|
| 7,619,906 B2 | 11/2009 | Schnetzka |
| 9,739,519 B2 | 8/2017 | Gan et al. |
| 2011/0083450 A1 | 4/2011 | Turner et al. |
| 2011/0221370 A1* | 9/2011 | Fukuta ............. H02M 7/53873 318/400.27 |

(Continued)

*Primary Examiner* — Kawing Chan
*Assistant Examiner* — Gabriel Agared
(74) *Attorney, Agent, or Firm* — Fletcher Yoder, P.C.

(57) ABSTRACT

The present disclosure includes techniques for implementing a variable speed drive (VSD) in an environmental conditioning system to facilitate mitigating or eliminating system faults. The variable speed drive drives a motor during on-cycles and heats motor windings of the motor during off-cycles. The variable speed motor drive includes a rectifier that converts alternative-current (AC) power input to a direct-current (DC) power output, a DC bus that is coupled to the rectifier and includes a DC bus transistor, and an inverter. The DC bus transistor pre-charges a DC capacitor of the DC bus to drive the motor during on-cycles and receives a gate pulse with a duty cycle based on a differential temperature, where the gate pulse heats the motor windings. The inverter receives the gate pulse applied to the DC bus transistor and transmits it a motor winding to prevent moisture on the motor winding.

20 Claims, 5 Drawing Sheets

(56) References Cited

U.S. PATENT DOCUMENTS

| | | | |
|---|---|---|---|
| 2011/0278918 A1* | 11/2011 | Shindo | B60L 3/04 |
| | | | 307/9.1 |
| 2014/0097093 A1* | 4/2014 | Showalter | H02M 3/155 |
| | | | 205/341 |
| 2015/0070047 A1* | 3/2015 | Yan | G01R 31/42 |
| | | | 324/765.01 |
| 2016/0047579 A1* | 2/2016 | Yan | F25B 49/005 |
| | | | 62/228.1 |
| 2017/0222595 A1 | 8/2017 | Daugherty, III | |
| 2017/0302200 A1* | 10/2017 | Marcinkiewicz | H02M 1/32 |

* cited by examiner

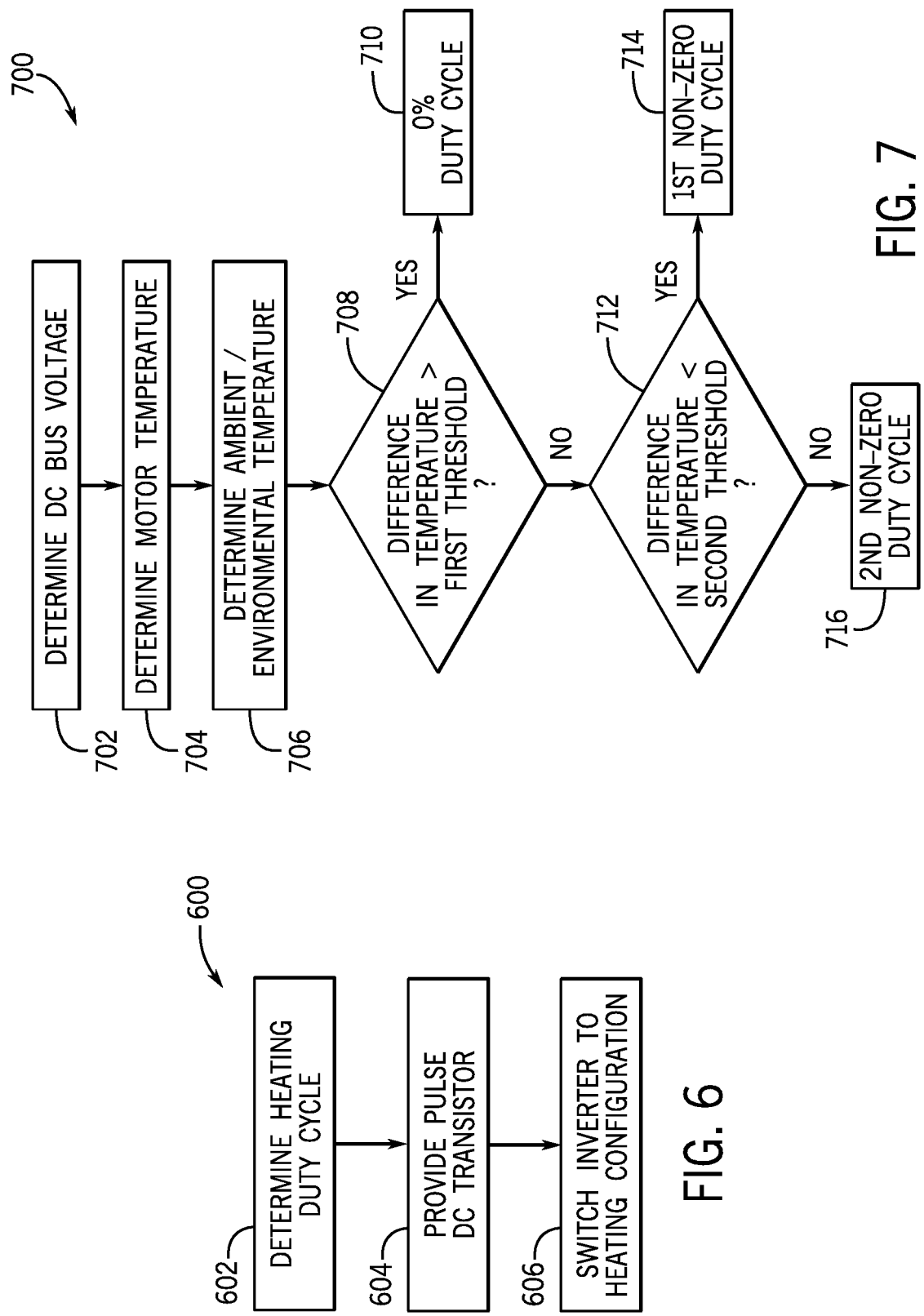

VARIABLE SPEED MOTOR DRIVE WITH INTEGRATED MOTOR HEATING SYSTEMS AND METHODS

CROSS-REFERENCE TO RELATED APPLICATION

This application is a Non-Provisional patent application claiming priority to and benefit of U.S. Provisional Patent Application No. 62/722,481, entitled "VARIABLE SPEED MOTOR DRIVE WITH INTEGRATED MOTOR HEATING SYSTEMS AND METHODS," filed Aug. 24, 2018, which is incorporated herein by reference in its entirety for all purposes.

BACKGROUND

The present disclosure generally relates to electric motors and, more particularly, to variable speed motor drives used to drive electric motors deployed (e.g., implemented) in an environmental conditioning system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Environmental conditioning systems are often deployed in buildings to control air conditions (e.g., temperature and/or humidity) of an interior space and/or in industrial systems to control equipment temperature. For example, a heating, ventilation, and air conditioning (HVAC) system may include equipment, such as an HVAC unit, which operates to produce temperature and/or humidity-controlled air by transferring heat between a circulated refrigerant and the air. As an additional example, a chiller system may use heat transfer between a circulated refrigerant and a liquid (e.g., water) to control temperature of equipment or another process stream. In any case, at least in some instances, one or more faults may occur in an environmental conditioning system during system start-up, for example, due to the sudden supply of electrical power to a component of the system, such as a motor winding. At least in some instances, attempting to startup or operate the system while a fault is present may result in component failure and/or reduction in lifespan of the system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a variable speed drive (VSD) drives a motor during on-cycles and heats motor windings of the motor during off-cycles, in which the variable speed motor drive includes a rectifier that convert alternative-current (AC) power input to a direct-current (DC) power output. The variable speed motor drive also includes a DC bus coupled to the rectifier and includes a DC bus transistor, where the DC bus transistor pre-charges a DC capacitor of the DC bus to drive the motor during on-cycles and receives a gate pulse with a duty cycle based at least in part on a differential temperature during off-cycles, where the gate pulse heats the motor windings. The variable speed motor further includes an inverter that includes multiple inverter switches, in which the inverter receives the gate pulse applied to the DC bus transistor and transmits the gate pulse to one of the motor windings to prevent accumulation of moisture on the one of the motor windings.

In an embodiment, an environmental conditioning system includes a motor including stator windings and a variable speed drive (VSD). The variable speed drive drives the motor during an on-cycle and heats the stator windings during an off-cycle. The variable speed drive includes a rectifier that converts alternative-current (AC) power input to a direct-current (DC) power output, a DC bus coupled to the rectifier and including a DC bus transistor, and an inverter comprising multiple inverter switches. The DC bus transistor pre-charges a DC capacitor of the DC bus to drive the motor during on-cycles and receives a gate pulse with a duty cycle based at least in part on a differential temperature during off-cycles, where the gate pulse heats the motor windings. The inverter receives the gate pulse applied to the DC bus transistor and transmits the gate pulse to one of the motor windings to prevent accumulation of moisture on the one of the motor windings.

In an embodiment, a method for driving a motor at various speeds and providing heat to motor windings of the motor, using a variable speed drive, includes pre-charging a DC capacitor of a DC bus of the variable speed drive during an off-cycle using a DC bus transistor, where pre-charging the DC capacitor enables driving the motor during an on-cycle, where the variable speed drive drives the motor at the various speeds during the on-cycle and provides heat to the motor windings during the off-cycle. The method also includes heating the motor windings using a gate pulse received with a duty cycle based at least in part on a differential temperature during the off-cycle. The method further includes transmitting the gate pulse to the motor windings to prevent accumulation of moisture on the one of the motor windings.

BRIEF DESCRIPTION OF THE DRAWINGS

Various aspects of the present disclosure may be better understood upon reading the following detailed description and upon reference to the drawings in which:

FIG. 6 is a flow diagram of an example process for operating the modified variable speed motor drive of FIG. 3 in an off-cycle mode, in accordance with an embodiment of the present disclosure; and FIG. 7 is a flow diagram of an example process for determining a target duty cycle for a bus semiconductor switching device in the modified variable speed motor drive of FIG. 3 to be used during an off-cycle mode, in accordance with an embodiment of the present disclosure.

DETAILED DESCRIPTION

Figure 1:
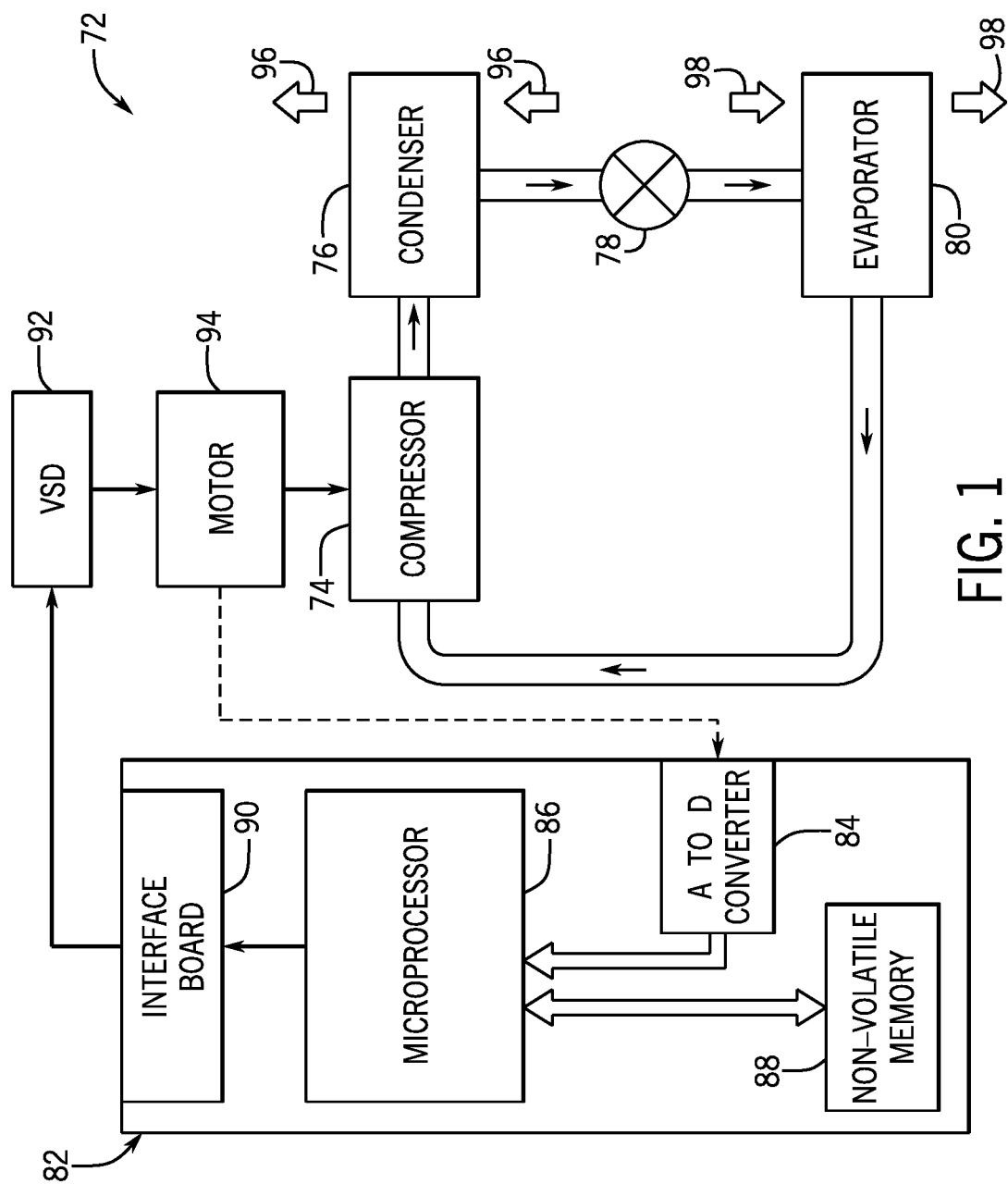
FIG. 1 is a block diagram of refrigerant circuit that includes a motor and a variable speed motor drive, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to electric motors and, more particularly, to variable speed motor drives used to drive electric motors deployed (e.g., implemented) in an environmental conditioning system. In particular, as will be described in more detail below, the present disclosure provides techniques for implementing (e.g., manufacturing) and/or operating a variable speed drive in an environmental conditioning system to facilitate mitigating or even eliminating system faults, which, at list in some instances, may improve operational reliability (e.g., up time) and/or life span of the environmental conditioning system.

Generally, an environmental conditioning system may operate to control environmental conditions or parameters, such as temperature and/or humidity. For example, a heating, ventilation, and air conditioning (HVAC) system may include equipment, such as an HVAC unit, which operates to produce temperature and/or humidity-controlled air by transferring heat between a circulated refrigerant and the air. As an additional example, a chiller system may use heat transfer between a circulated refrigerant and a liquid (e.g., water) to control temperature of equipment or another process stream.

To facilitate controlling environmental conditions, an environmental conditioning system, such as an HVAC system and/or a chiller system, may include one or more electric motors. For example, an electric motor may be coupled to and/or included in a compressor, which is deployed in a refrigerant (e.g., vapor compression) loop of an environmental conditioning system. More specifically, a rotor of the electric motor may be coupled to the compressor such that actuation of the electric motor and, thus, the compressor drives circulation of refrigerant through one or more (condenser and/or evaporator) heat exchangers. Another fluid (e.g., air and/or water) stream may be concurrently flowed through a heat exchanger in the refrigerant loop, thereby enabling one or more phase shifts (e.g., evaporation and/or condensation) of refrigerant flowing through the heat exchanger to heat and/or cool the other fluid stream.

In fact, at least in some instances, heating and/or cooling of the other fluid stream and, thus, resulting environmental conditions, may vary with actuation speed of the compressor and, thus, its electric motor. Generally, actuation of an electric motor results from rotation of a magnetic field produced between its rotor and its stator. For example, the electric motor may include one or more motor (e.g., rotor and/or stator) windings, which, when supplied with alternating current (AC) electrical power, produce a rotating magnetic field that actuates (e.g., rotates) its rotor.

Since actuation speed of an electric motor generally varies with frequency of received AC electrical power, a variable speed drive (VSD) (e.g., motor drive) is often electrically coupled between the electric motor and a power source, such as an electrical grid. In particular, and as will be described in more detail below, the variable speed drive may be implemented and/or operated to controllably vary characteristics, such as frequency and/or magnitude, of AC (e.g., three-phase) electrical power supplied to motor windings of the electric motor and, thus, resulting actuation speed of a compressor coupled thereto. To facilitate controllably varying characteristics of output AC electrical power to the motor, a variable speed drive often includes one or more semiconductor switching devices, such as metal-oxide-semiconductor field-effect transistors (MOSFETs), for example, which are communicatively coupled to a control sub-system (e.g., system and/or controller) of a corresponding environmental conditioning system.

However, at least in some instances, an environmental conditioning system may operate in relatively damp environments, thereby subjecting the components of the system to condensation. As an example, HVAC and chiller systems commonly use open drive motors to facilitate improving ease with which maintenance may be performed. The motor (e.g., stator and/or rotor) windings in the environmental condition system are particularly susceptible to the condensation. Briefly, the motor windings may facilitate motor actuation by generating a rotating magnetic field that interacts with a motor rotor to produce mechanical torque, which may then be used by the system. Because the motor windings may be supplied with high power levels, the wires of the winding are often heavily insulated to reduce likelihood arching and/or shorting. However, moisture due to condensation may accumulate relatively rapidly within the motor windings during periods when the motor is not in use. For example, moisture may accumulate in the motor windings within a few hours, such as overnight.

At least in some instances, the moisture may cause corrosion on the motor windings and/or failure of motor winding insulation due to a reduction in dielectric strength of the insulation. That is, the moisture may cause the insulation to become electrically conductive, thereby introducing short circuit conditions that ultimately result in failure of the motor and/or the system. The windings of the stator, or static portion of the motor, may be particularly susceptible to insulation failure due to moisture since stator windings may be subject to large power inputs and, thus, are designed with heavy insulation. As such, motor heaters may be used to remove (e.g., evaporate) the moisture. For example, external motor heaters may be used to remove moisture from the motor windings prior to startup of the motor. The external motor heaters may include heating elements that may be tied to the coil heads of the stator windings.

However, external motor heaters may not entirely remove the moisture accumulated in the motor windings, for example, due to physical distance (e.g., separation) from the motor windings. Further, external motor heaters may fail (e.g., become loose and/or burn out), thereby resulting in both the motor and the external motor heater to be removed for servicing. Additionally, external motor heaters may add bulk and/or cost to the environmental conditioning system. As such, alternative techniques for removing moisture from the motor windings may facilitate reducing implementation-associated costs, such as component count and/or physical footprint.

Accordingly, the present disclosure provides techniques for reducing likelihood that moisture accumulation in motor windings affects operation of a corresponding motor deployed in an environmental conditioning system, thereby facilitating a reduction or elimination of motor failures in the environmental conditioning system. Generally, a variable speed drive may include an AC to DC power converter (e.g., a diode bridge rectifier) to provide a variable voltage control of the incoming voltage supply, a DC bus (e.g., a filter) for voltage smoothing, and a DC to AC converter (e.g., inverter bridge) for a variable frequency output to the motor. As previously discussed, the motor may be an AC induction motor that has a rotor and stator windings, in which the rotor intersects a rotating magnetic field generated by the stator windings. In fact, actuation speed of a motor may generally be dependent on rotation rate (e.g., frequency) of the magnetic field. As such, by controlling switching in the variable speed drive, the frequency of AC electrical power supplied to the motor windings and thus, actuation speed of the electric motor may be adaptively controlled.

The general design of the variable speed drive may be modified reduce likelihood of moisture accumulation in the motor windings while also providing the normal functionality of a variable speed drive to enable adaptively controlling actuation speed of an electric motor connected thereto. As will be described in more detail below, the modified variable speed drive may include a DC bus transistor and a DC bus relay in the positive side of the DC bus to serve a dual purpose. In particular, the DC bus transistor may be used to pre-charge the DC bus to a target voltage. Upon a full bus potential (e.g., target voltage), the normally open relay in the DC bus may be closed, reducing heat loss while running. Additionally, the modified variable speed drive may include an inductor located between the DC bus transistor and inverter transistors, and a diode in a reverse biased configuration between the positive and negative DC bus to allow the circuit to also serve as a buck converter. The DC bus transistor may receive gate pulses with varying duty cycle, allowing the modified variable speed drive to function as a buck converter. The DC bus transistor may also pulse trickle voltage through the variable speed motor drive and into the motor windings to heat the motor winding. In this manner, a motor heating functionality may be integrated in the modified variable speed motor drive to drive a motor at varying speeds while also reducing or eliminating the system faults (e.g., moisture) in a compact and cost-effective way.

As will be discussed herein, in some embodiments, the modified variable speed motor drive (VSD) may operate in two modes, an "on-cycle" mode and an "off-cycle" mode, to provide the dual purpose functionality of both a general variable speed drive that may control the speed of the compressor in the environmental conditioning system and also a motor heater that may remove moisture from the motor windings, which may otherwise result in system faults.

In some embodiments, a control system may generally control operation of the modified variable speed motor drive (e.g., via circuit components) to provide dual functionality in the on-cycles and off-cycles. In the on-cycle mode, the modified variable speed motor drive may operate as a general variable speed drive that may be adjusted to drive and control the motor at variable speeds. In particular, the modified variable speed motor drive may provide a particular motor speed and torque control by varying frequency and/or voltage of electrical power supplied to the electric motor during motor on-cycles. In fact, in some embodiments, the DC bus transistor in the modified variable speed drive may facilitate pre-charging the DC bus, which, at least in some instances, may facilitate improving operational reliability of the modified variable speed drive and/or the electric motor. For example, to pre-charge the DC bus, the DC bus relay may be maintained in its open (e.g., disconnected) state (e.g., position) and duty cycle of the DC bus transistor may gradually increase until the DC bus reaches or nearly reaches a target DC voltage to be used while operating in the on-cycle mode. Subsequently, the DC bus transistor may be switched to its open (e.g., disconnected) state while the DC bus relay is switched to its closed (e.g., connected) state, which may facilitate reducing heat loss during on-cycles.

In the off-cycle mode, the control system may determine an operation parameter, such as humidity and/or differential temperature of the stator and ambient environment, and provide an appropriate duty cycle to the DC bus transistor based on the operation parameter during off-cycles. Appropriate duty cycles (e.g., of gate voltage pulses), for example, may be introduced to the variable speed motor drive at the DC bus transistor such that the modified variable speed motor drive provides a buck converter functionality and heats the motor windings in a rotating fashion. Furthermore, the control system may alternate (e.g., rotate) the inverter transistors that are gated, thereby periodically switching the motor windings that are heated by the voltage provided to the DC bus transistor, which, at least in some instances, may facilitate evenly heating the motor windings during off-cycles.

With this in mind, FIG. 1 depicts a vapor compression system 72 that may be used in the environmental conditioning system described above. As depicted, the vapor compression system 72 may circulate a refrigerant through a circuit starting with a compressor 74. The circuit may also include a condenser 76, an expansion valve(s) or device(s) 78, and an evaporator 80.

In some embodiments, the vapor compression system 72 may be implemented in one or more conditioning units, such as HVAC units and/or chiller units. The conditioning unit may be disposed on the roof the building, located in equipment rooms of the building, or in areas adjacent to the building. Additionally or alternatively, the conditioning unit may be part of a split system that includes an outdoor conditioning unit and an indoor conditioning unit.

As in the depicted example, the vapor compression system 72 may further include a control system 82 that has an analog to digital (A/D) converter 84, a microprocessor 86, a non-volatile memory 88, and/or an interface board 90. The microprocessor 86 may include any type of processing circuitry, such as one or more processors, one or more "general-purpose" microprocessors, one or more special-purpose microprocessors, and/or one or more application specific integrated circuits (ASICS), or some combination thereof. For example, the microprocessor 86 may include one or more reduced instruction set (RISC) processors. Further, the control system 82 may be the same control system used to control the overall environmental conditioning system or a separate control system dedicated to the vapor compression system 72.

The control system 82 and its components may function to regulate operation of the vapor compression system 72 based on feedback from an operator, from sensors of the vapor compression system 72 that detect operating conditions, and so forth. For example, the control system 82 may control operation of condition unit to maintain a desired temperature by comparing a temperature sensed to a temperature setpoint. When the environmental conditioning system is operating as a cooling system, the conditioning unit may become operative to cool additional air for circulation when the temperature is higher than the temperature setpoint. Further, when the temperature is lower than the set point, the conditioning unit may stop refrigeration cycle temporarily to avoid further cooling of the air. In some embodiments, the conditioning system may operate in a heat pump mode whereby operations of the conditioning unit are reversed to heat air flowing into the building. Additionally or alternatively, the control system 82 may determine the temperature of the motor stator and instruct a modified variable speed motor drive (VSD) 92A to perform motor heating functionality.

Furthermore, in some embodiments, the control system 82 may be communicatively coupled to and/or include a user interface that provides information to and/or receives information from a user. The user interface may include any suitable combination of input and output devices, such as an electronic display, a touchscreen, a stylus, a keypad, a button, and/or the like, to enable communicating system fault and/or malfunction information to a user.

Moreover, in some embodiments, the control system 82 may be communicatively coupled to and/or include a communication interface that may enable communication with any suitable communication network, such as wiring terminals, a cellular network, a Wi-Fi network, a personal area network (PAN), a local area network (LAN), a wide area network (WAN), and/or the like. For example, the communication interface may enable the control system 82 to communicate with a user interface implemented on a user's mobile device, which is also communicatively coupled to the communication network.

In some embodiments, the vapor compression system 72 may use one or more of the variable speed motor drive 92, a motor 94, the compressor 74, the condenser 76, the expansion valve or device 78, and/or the evaporator 80. The variable speed motor drive 92 may allow motors to vary their speed based on the change in load, thereby enabling efficient motor operation. As such, the variable speed motor drive 92 may vary the power characteristics delivered to the motor. Specifically, the variable speed motor drive 92 may receive alternating current (AC) power having a fixed line voltage and fixed line frequency from an AC power source, and provide power having a variable voltage and frequency to the motor 94. In other embodiments, the motor 94 may be powered directly from an AC or direct current (DC) power source. The motor 94 may include any type of electric motor that can be powered by the variable speed motor drive 92 or directly from an AC or DC power source, such as a switched reluctance motor, an induction motor, an electronically commutated permanent magnet motor, or another suitable motor.

The motor 94 may additionally include motor windings ("W"), such as stator windings and/or rotor windings. In some embodiments, the stator, or static portion of the motor, may include windings around a stator core that receive a one-phase or three-phase voltage and provides a rotating magnetic field to power the motor rotor from current running through the stator windings. The stator windings may be heavily insulated to reduce likelihood electrical faults that may short the motor while receiving the power supply. Additionally or alternatively, the rotor, or movable portion, of the motor 94 may include windings that are powered via the DC power source or via electromagnetic induction generated from the rotating electromagnetic field produced by the stator windings.

The motor 94 may drive the compressor 74, which compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid 96 passing across the condenser 76, such as ambient air or water. The refrigerant vapor may condense to a refrigerant liquid in the condenser 76 as a result of thermal heat transfer with the fluid 96. The liquid refrigerant from the condenser 76 may flow through the expansion device 78 to the evaporator 80.

The liquid refrigerant delivered to the evaporator 80 may absorb heat from another fluid stream 98, such as a supply air stream provided to the building or supply water. The liquid refrigerant in the evaporator 80 may undergo a phase change from the liquid refrigerant to a refrigerant vapor. In this manner, the evaporator 80 may reduce the temperature of the fluid stream 98 via thermal heat transfer with the refrigerant. Thereafter, the vapor refrigerant may exit the evaporator 80 and return to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the fluid stream 98 and may reheat the fluid stream 98 when the fluid stream 98 is overcooled to remove humidity from the fluid stream 98 before the fluid stream 98 is directed to the building 10 or the residence 52.

It should be appreciated that any of the features described herein may be incorporated with the conditioning unit, an HVAC system, a chiller system, or other environmental conditioning systems. Additionally, while the features disclosed herein are described in the context of embodiments that directly heat and cool a supply air stream provided to a building or other load, embodiments of the present disclosure may be applicable to other environmental conditioning systems as well. For example, the features described herein may be applied to mechanical cooling systems, free cooling systems, chiller systems, or other heat pump or refrigeration applications.

As mentioned above, the variable speed motor drive 92 may drive the motor 94 by varying the voltage and/or frequency of power supplied to the motor, for example, based on the power load requirements for the particular motor (e.g., motor driving a compressor in the conditioning system). To help illustrate, an example, of a schematic diagram of a three-phase variable speed motor drive 92 is shown in FIG. 2.

The variable speed motor drive 92 may generally be broken down into three main components: the rectifier or converter 200, the DC bus 202, and the inverter 204. Briefly, the converter 200 may include multiple diodes 214, such as a first diode (D1) 214A, a second diode (D2) 214B, a third diode (D3) 214C, a fourth diode (D4) 214D, a fifth diode (D5) 214E, and a sixth diode (D6) 214F. In some embodiments, each of or a subset of the diodes (D1-D6) 214 may alternatively be thyristors or silicon-controlled rectifiers (SCRs). In other embodiments, each of or a subset of the diodes 214 may be transistors (e.g., insulated-gate bipolar transistors (IGBTs), such silicon carbide IGBTs, metal-oxide-semiconductor field-effect transistors (MOSFETs), and the like (e.g., diodes (D1-D3) 214A-C are SCRs while diodes (D4-D6) 214D-F are MOSFETs). As such, the diodes (D1-D6) 214A-214F may be a combination of diodes, thyristors, silicon-controlled rectifiers, and/or transistors.

Figure 2:
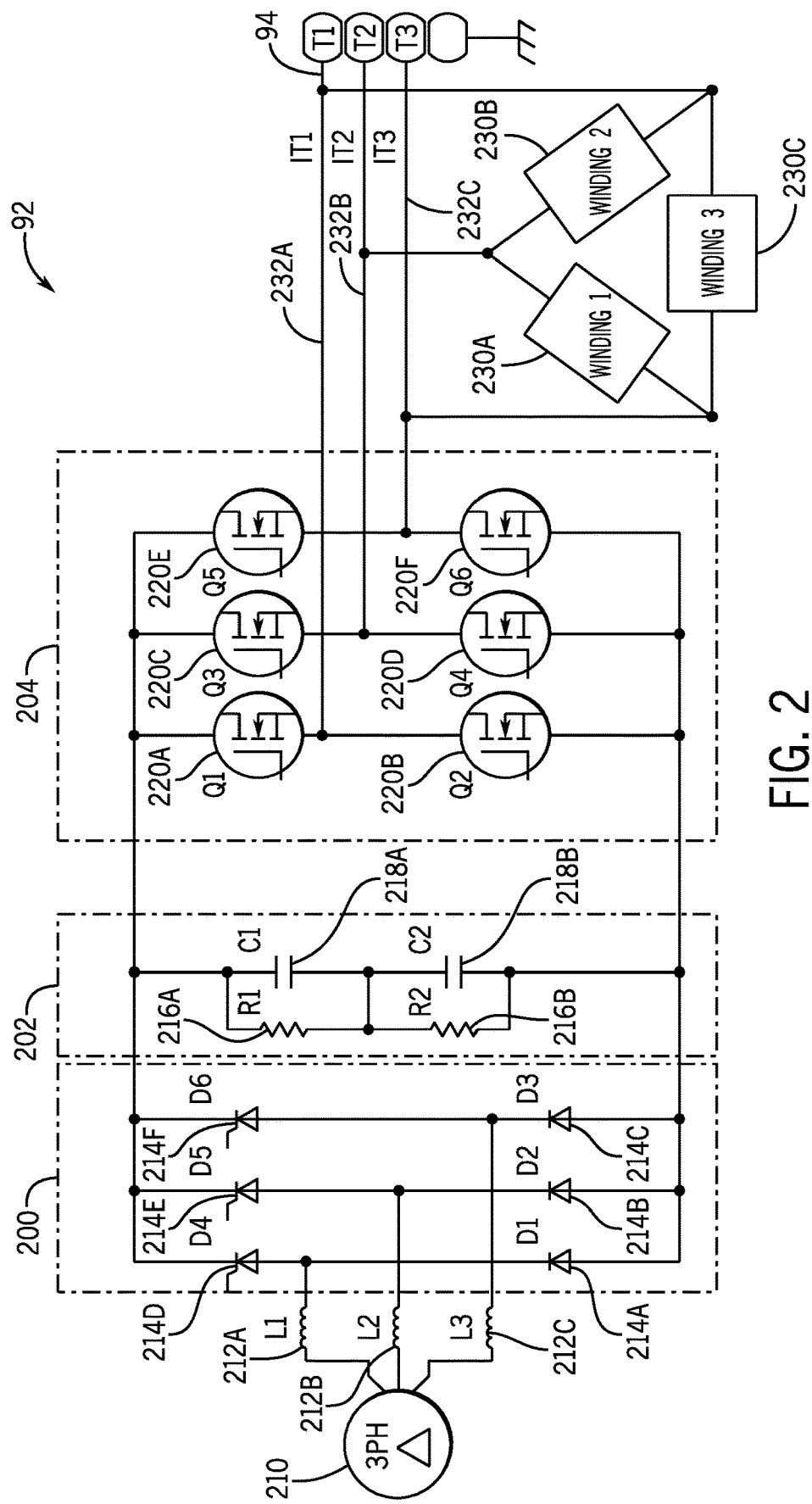
FIG. 2 is a schematic diagram of an example of a three-phase variable speed motor drive, in accordance with an embodiment of the present disclosure.

As shown in FIG. 2, the converter 200 may receive three-phase AC power 210 that is converted to a DC equivalent power output. For example, a first inductor (L1) 212A receives a first phase of the AC power input, which when more positive than either the second phase fed to a second inductor (L2) 212B or the third phase fed to a third inductor (L3) 212C, causes current to flow in the branch of the first diode (D1) 214A and the fourth diode (D4) 214D in a single direction. A similar process may occur for branches associated with the second inductor (L2) 212B and the third inductor (L3) 212C as their associated phases become more positive. As each diode 214 opens and closes, a current pulse is generated that produces a DC voltage on the DC bus 202. The DC voltage may include an AC ripple. Fewer or greater number of diodes 214 may be included based on the type of power input to the converter 200. In some embodiments, the AC ripple may be smoothed (e.g., removed) by one or more filters coupled to the DC bus 202.

As shown, the DC bus 202 may include a first resistor (R1) 216A, a second resistor (R2) 216B, a first capacitor (C1) 218A, and a second capacitor (C2) 218B, forming a filter circuit that reduces or eliminates the AC ripple by filtering to generate a smooth DC voltage that is supplied to the inverter 204. Further, the capacitors 218 may act as energy reservoirs when current is provided to the motor 94. The inverter 204 may convert the DC voltage to back to an AC voltage with a desired frequency and voltage amplitude for a phase of the motor 94, thereby providing the variable speed and frequency power output to the motor 94. By way of example, the variable speed and frequency power output may be based on the motor 94 driving a specific compressor 74, such as to compress refrigerant vapor in the conditioning system.

The inverter 204 may include multiple transistors 220, such as a first transistor (Q1) 220A, a second transistor (Q2) 220B, a third transistor (Q3) 220C, a fourth transistor (Q4) 220D, a fifth transistor (Q5) 220E, and a sixth transistor (Q6) 220F. To control voltage and/or frequency, for example, the control system 82 may instruct the first transistor (Q1) 220 to close, providing a positive voltage to the first phase of the motor followed by the first transistor (Q1) 220A opening and the second transistor (Q2) 220B closing to provide a negative voltage to the first phase of the motor 94. Based on the frequency with which the transistors 220 are gated, the power frequency may be varied. Additionally, the voltage may be varied using techniques such as pulse width modulation (PWM). As such, the variable speed motor drive 92 may modify the frequency and voltage of the power delivered to the motor 94 based on the frequency and voltage required by the load (e.g., compressor 74 of FIG. 1), as determined by the control system 82. It should be noted that while the inverter transistors 220 are shown as MOSFETs, insulated-gate bipolar transistors (IGBTs), such as silicon carbide IGBTs may be used in implementation.

In the current embodiment, the motor 94 includes stator motor windings that are connected in a delta shape. As shown, the motor 94 may include a first stator winding (winding 1) 230A, a second stator winding (winding 2) 230B, and a third stator winding (winding 3) 230C. The delta-shaped connection provides a serial connection between the windings 230, such that the first phase of the first winding (winding 1) 230A is connected to the end of the second winding (winding 2) 230B. Each corner of the stator windings 230 may be connected to a respective phase voltage. For example, the power provided by a first phase path 232A may be connected to the third stator winding (winding 3) 230C. Moreover, the power provided by a second phase path 232B may be connected to the second stator winding (winding 2) 230B. Further, the power provided by a third phase path 232C may be connected to the first stator winding (winding 1) 230A. Overtime, the stator windings 230 of the motor 94 may become contaminated or damaged doing to moisture condensation in the stator windings. As a result, the motor 94 may no longer accurately and/or efficiently power the vapor compression system 72. To facilitate improving operational reliability of the motor 94, the variable speed motor drive 92 may be modified to provide integrated motor heating functionality that reduces or even eliminates moisture accumulation in the motor windings.

Figure 3:
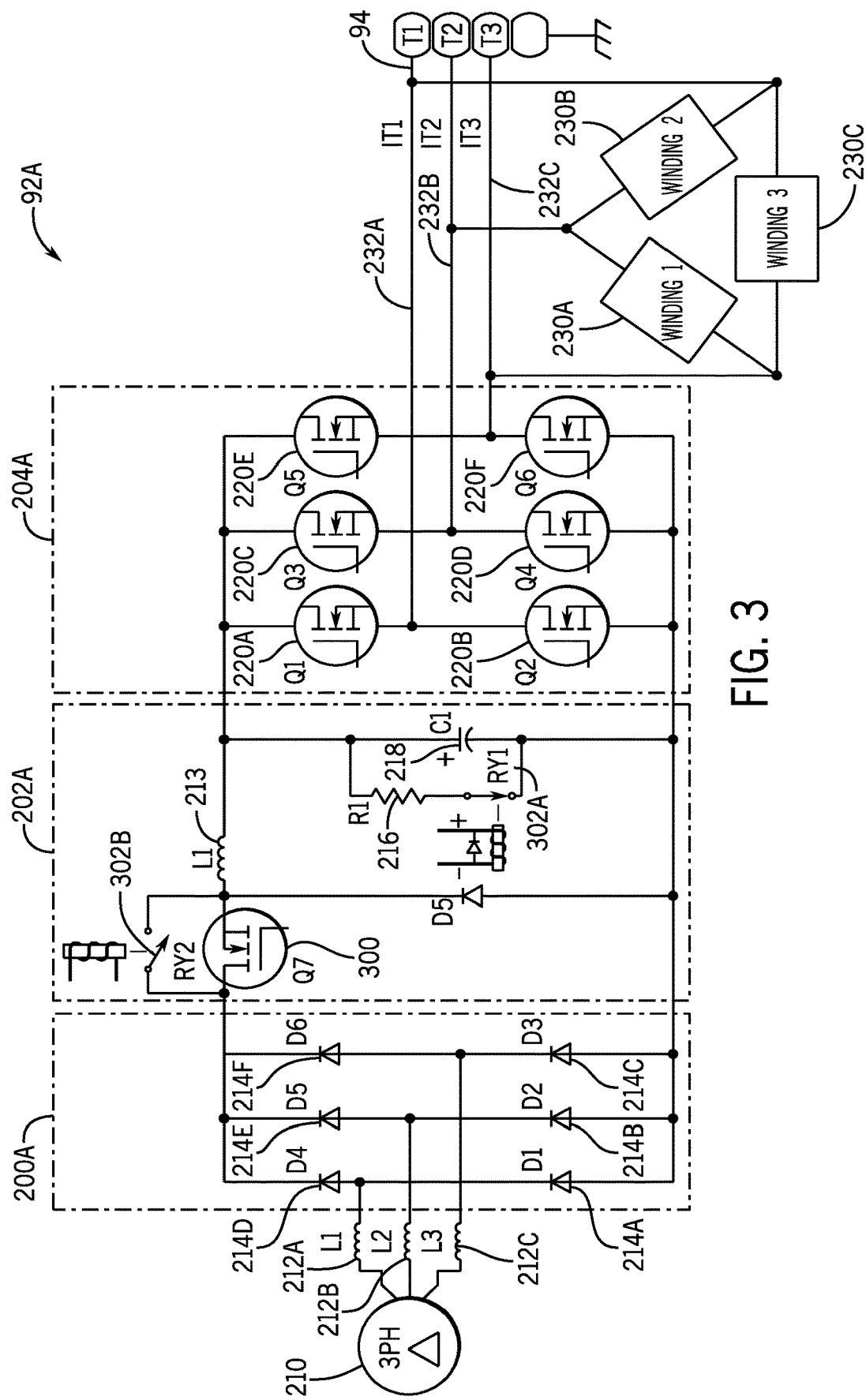
FIG. 3 is a schematic diagram of an example of a modified variable speed motor drive with an integrated motor heater, in accordance with an embodiment of the present disclosure FIG. 4 a flow diagram of an example process for selectively operating the modified variable speed motor drive of FIG. 3 in an on-cycle mode or an off-cycle mode, in accordance with an embodiment of the present disclosure.

To help illustrate, a schematic diagram of a modified variable speed motor drive 92A that serves a dual purpose of driving the motor 94 during the on-cycles and providing motor heating functionality during off-cycles is shown in FIG. 3. Similar to FIG. 2, the modified variable speed motor drive 92A is shown as a two-level voltage source variable speed motor drive 92 that uses a converter 200A of diodes (D1-D6) 214 to control current output direction to the DC bus 202A. That is, the converter 200A may function similarly to the description of converter 200 of FIG. 3. Additionally, the inverter 204A and the stator windings 230 of the motor 94 may also function similarly to the description of inventor 204 of FIG. 3.

However, the DC bus 202A of the variable speed motor drive 92A may be modified to include a DC bus transistor (Q7) 300 and a DC bus relay (RY2) 302B coupled in parallel between the converter 200A and the inverter 204A. As will be discussed in detail, the DC bus relay (RY2) 302B may generally be switched to and/or maintained in its closed (e.g., connected) state while the modified variable speed motor drive 92A is operating to provide frequency and/or voltage controlled AC electrical power to an electric motor 94 in an on-cycle mode. However, as will be described in more detail below, in some embodiments, the DC bus relay (RY2) 302B may be switched to and/or maintained in its open (e.g., disconnected) state during at least a portion of the on-cycle to facilitate controllably pre-charging the DC bus 202A.

In such embodiments, pre-charging of the DC bus 202A may be controlled by controlling duty cycle of the DC bus transistor (Q7) 300. For example, upon receiving a run command, the control system 82 may supply a first control signal to the DC bus relay (RY2) 302B, which causes (e.g., instructs) the DC bus relay (RY2) 302B to switch to and/or maintain its open (e.g., disconnected) state, and a second control signal to the DC bus transistor (Q7) 300, which causes the DC bus transistor (Q7) 300 to alternate between its closed (e.g., connected) state and its open (e.g., disconnected) state. Once the DC bus 202A voltage potential reaches a predetermined threshold (e.g., target), the DC bus relay (RY2) 302B may be switched to and/or maintained in its closed (e.g., connected) state, thereby bypassing the DC bus transistor (Q7) 300, which, at least in some instances, may facilitate improving operational efficiency of the modified variable speed drive 92A, for example, by reducing heat loss and, thus, power consumption compared to simply maintaining the DC bus transistor (Q7) 300 at a 100% duty cycle.

On the other hand, the DC bus relay (RY2) 302B may generally be switched to and/or maintained in its open (e.g., disconnected) state during off-cycles. As will be described in more detail below, during off-cycles, the modified variable speed motor drive 92A may be operated to provide integrated motor heating. For example, upon a determination that the motor windings 230 need to be heated, the duty cycle of the DC bus transistor (Q7) 300 may be varied to maintain a predetermined threshold differential. During this function, particular inverter transistors 220 may be gated on to provide a path for low magnitude current to flow through the stator windings 230, which will produce heat that facilitates removing moisture from the stator windings 230.

Additionally, as in the depicted example, a relay (e.g., a diode in a reverse biased configuration) may be located between the positive and negative DC bus 202A to allow the circuit to also serve as a buck converter. Furthermore, as in the depicted example, an inductor (L1) 213 may be electrically coupled between the DC bus transistor (Q7) 300 and the inverter transistors 220 of the inverter 204A of the positive DC bus 202A. Furthermore, as in the depicted example, another relay (RY1) 302A and a bleed-off resistor (R1) 216A may be electrically coupled between the positive DC bus 202A and the negative DC bus 202A in parallel with a DC bus capacitor (C1) 218, for example, to provide shock protection. In particular, when the variable speed motor drive 92A enters the off-cycle mode, the other relay (RY1) 302A may be switched to dissipate the voltage stored on the capacitor (C1) 218, thereby reducing risk of shock when handling or servicing the system.

Although FIG. 3 illustrates a modified variable speed motor drive 92A that accepts a three-phase power input, the modified variable speed motor drive 92A may be a multi-level voltage source that may receive a single-phase power input. Additionally, the diodes 214 may be SCRs or any other electrical component that controls the direction of current flow. It should also be noted that while the transistors 220 are depicted as MOSFETs, any other type of transistor technology, such as IGBTs, may be used as well as one or more capacitors in the DC bus 202A.

In any case, as will be described in more detail below, implementing a modified variable speed motor drive 92A in this manner may enable operation to be controlled to provide dual functionality. By way of example, the modified variable speed motor drive 92A may drive actuation of a motor 94 by powering its stator windings 230 to produce a rotating magnetic field that actuates the rotor at various speeds. Additionally, the modified variable speed motor drive 92A may heat the motor 94 to remove moisture on the stator windings 230, for example, that may result from the motor 94 not powering the vapor compression system 72 for an extended period of time (e.g., overnight).

Figure 4:
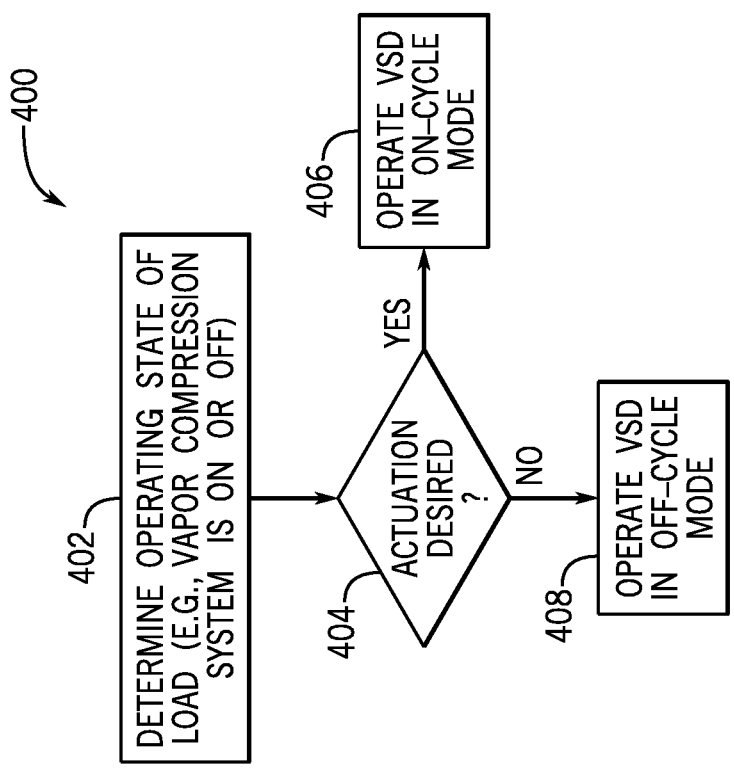

To help further illustrate, an example of a process 400 for operating a modified variable speed motor drive 92A is described in FIG. 4. Although described in a particular order, which represents a particular embodiment, it should be noted that the process 400 may be performed in any suitable order. Additionally, embodiments of the process 400 may omit process blocks and/or include additional process blocks. Moreover, in some embodiments, the process 400 may be implemented at least in part by executing instructions stored in a tangible, non-transitory, computer-readable medium, such as memory 88, using processing circuitry, such as a microprocessor 86 deployed in a control system 82.

Accordingly, in some embodiments, a control system 82 may determine (process block 402) the operating state of the load (e.g., the vapor compression system 72). For example, to facilitate in determining the operating state of the load, the control system 82 may determine that the vapor compression system 72 is off. The control system 82 may further determine whether (decision block 404) actuation is desired based on the operating state of the load and certain parameters, such as humidity and temperature, of the system 72 and/or the environment. As an example, if the temperature in the building is below a predetermined set point, the control system 82 may determine that the vapor compression system 72 should turn on to appropriately condition the air. In such instances, actuation may be desired to turn on the system 72.

In the event that actuation is desired, the control system 82 may operate (process block 406) the modified variable speed motor drive 92A in an on-cycle mode, during which the modified variable speed motor drive 92A electrically powers the motor 94 to enable the motor to carry out actuation. Specifically, in some embodiments, the variable speed motor drive 92A may enter the on-cycle mode whereby the DC bus 202A is pre-charged and a variable frequency and/or voltage is subsequently provided to the motor 94.

Figure 5:
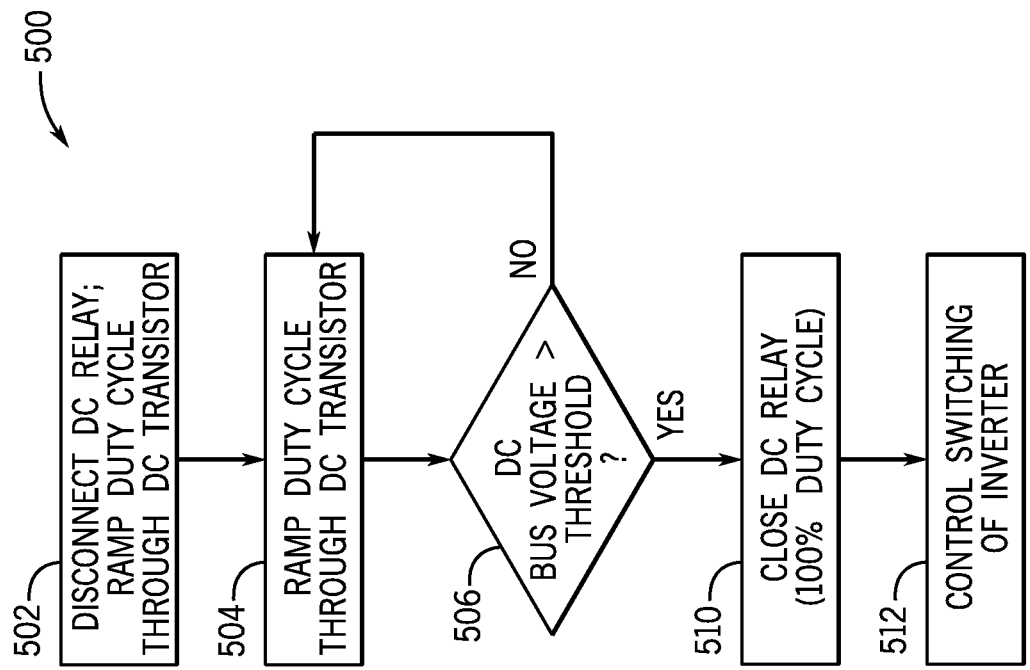
FIG. 5 is a flow diagram of an example process for operating the modified variable speed motor drive of FIG. 3 in an on-cycle mode, in accordance with an embodiment of the present disclosure.

To illustrate, an example of a process 500 for operating the modified variable speed motor drive 92A in an on-cycle mode is described in FIG. 5. Although described in a particular order, which represents a particular embodiment, it should be noted that the process 500 may be performed in any suitable order. Additionally, embodiments of the process 500 may omit process blocks and/or include additional process blocks. Moreover, in some embodiments, the process 500 may be implemented at least in part by executing instructions stored in a tangible, non-transitory, computer-readable medium, such as memory 88, using processing circuitry, such as a microprocessor 86 deployed in a control system 82.

Accordingly, in some embodiments, a control system 82 may instruct the DC bus relay (RY2) 302B to switch to and/or maintain its open (e.g., disconnected) state (e.g., position) (process block 502). Next, the control system 82 may gradually ramp (process block 504) the duty cycle for the DC bus transistor (Q7) 300, thereby selectively controlling supply of electrical power from the converter 200A to the DC bus 202A. For example, the control system 82 may direct the modified variable speed motor drive 92A to initially provide a 5% duty cycle pulse width to the DC bus transistor (Q7) and to gradually increase the duty cycle provided to the DC bus 202A. In this manner, the DC bus 202 and voltage across the DC bus capacitor (C1) 218 may be controllably (e.g., gradually over time) pre-charged, which, at least in some instances, may facilitate improving operational reliability of the modified variable speed motor drive 92A and/or an electric motor 94 coupled thereto.

The control system 82 may then determine (decision block 506) whether the voltage of the DC bus 202A is greater than a specified voltage threshold (e.g., target). If the voltage is below the threshold, then ramping (process block 504) of the duty cycle may continue. However, when the voltage is above the threshold, the control system 82 may instruct the DC bus relay (RY2) 302B to switch to and/or maintain its closed (e.g., connected) state, thereby bypassing the DC bus transistor (Q7) 300. For example, when voltage reaches a threshold of 85% of the voltage peak value, the control system 82 may instruct the DC bus relay (RY2) 302B to close, thereby allowing for current to flow through the bypass path at nearly 100% duty cycle. As such, the DC bus relay (RY2) 302B may provide an alternative path to the DC bus transistor (Q7) 300 path to reduce heat loss due to the voltage drop across the DC bus transistor (Q7) 300. The DC bus capacitor (C1) 218 may store the energy provided during pre-charging and may significantly reduce or eliminate the AC ripple. By functioning as an energy reservoir while the transistors 220 pulse current to the motor 94, the capacitor (C1) 218 may also correct the power factor as seen by the source.

The control system 82 may control (process block 512) the transistors 220 (e.g., switches) of the inverter 204A to provide power to the motor 94 with the appropriate frequency and/or voltage, for example, based on the specifications of the particular motor 94 for the vapor compression system 72. For example, the control system 82 may gate (e.g., turn on and/or connect) the first transistor (Q1) 220A, the fourth transistor (Q4) 220D, and the sixth transistor (Q6) of the inverter 204A, such that a pulse is provided to the electric motor 94. Using pulse-width modulation (PWM) and by varying the frequency of gating the transistors 220, a series of pulses that mimic a sine waveform may be sent to the motor 94 to provide the varying frequency and voltage required by to drive the load. In this manner, the modified variable speed motor drive 92A may function (e.g., operate) as a general variable speed motor drive that is used to drive an electric motor 94 during on-cycles. That is, the modified variable speed motor drive 92 may power the motor 94 normally when the vapor compression system 72 is functioning as expected. On the other hand, returning now to FIG. 4, when actuation is not desired, the control system 82 may direct the variable speed motor drive 92A to operate in an off-cycle mode to provide integrated motor heating functionality.

To help illustrate, an example of a process 600 for operating a modified variable speed motor drive 92A in an off-cycle mode is described in FIG. 6. Although described in a particular order, which represents a particular embodiment, it should be noted that the process 600 may be performed in any suitable order. Additionally, embodiments of the process 600 may omit process blocks and/or include additional process blocks. Moreover, in some embodiments, the process 600 may be implemented at least in part by executing instructions stored in a tangible, non-transitory, computer-readable medium, such as memory 88, using processing circuitry, such as a microprocessor 86 deployed in a control system 82.

Accordingly, in some embodiments, a control system 82 may determine (process block 602) the appropriate heating duty cycle of the gate pulse to the DC bus transistor (Q7) 300. For example, the appropriate heating duty cycle may be based on the amount of condensation on the stator windings 230 of the motor 94 and/or temperature of the motor 94 and its deviation from normal operation temperature. That is, the modified variable speed motor drive 92A may provide a more aggressive heating duty cycle when the moisture or temperature is a significant deviation.

To help further illustrate, an example of a process 700 for determining the appropriate heating duty cycle is described in FIG. 7. Although described in a particular order, which represents a particular embodiment, it should be noted that the process 700 may be performed in any suitable order. Additionally, embodiments of the process 700 may omit process blocks and/or include additional process blocks. Moreover, in some embodiments, the process 700 may be implemented at least in part by executing instructions stored in a tangible, non-transitory, computer-readable medium, such as controller memory 48, using processing circuitry, such as the controller processor 46.

Accordingly, in some embodiments, the control system 82 may determine (process block 702) the voltage of the DC bus 202A. Additionally, the control system 82 may determine (process block 704) the temperature of an electric motor 94. In some embodiments, the temperature of stator windings 230 in the electric motor 94 may be measured via temperature sensors (e.g., resistance temperature detectors (RTDs)) located on and/or within the electric motor 94. Moreover, the control system 82 may also determine (process block 706) ambient or environmental temperature. To determine the ambient temperature, the same or similar temperature sensors on and/or within the motor 94 may be used.

Using these measurements, the control system 82 may determine whether (decision block 708) the difference in temperature (e.g., between the motor temperature and the ambient temperature) is above a predetermined first threshold. When the temperature difference is greater than a first threshold, the control system 82 may provide (process block 710) a 0% duty cycle (e.g., no gate pulse) to the positive DC bus transistor (Q7) 300. For example, when the temperature difference between the motor temperature and the ambient temperature of the environment is greater than 10° C., the motor stator windings 230 may be safely hit with a first pulse of the PMW from the inverter 204A without risking the creation of a short circuit condition caused by reduction of motor winding insulation dielectric strength from moisture accumulation in the motor stator windings 230.

On the other hand, when the temperature difference is less than the first threshold, the control system 82 may determine whether (decision block 712) the temperature difference is less than a second threshold. If so, then the control system 82 may provide (process block 714) a first non-zero duty cycle of the gate pulse to the DC bus transistor (Q7) 300 and subsequently to the transistors 220 of the inverter 204A to heat the stator windings 230 and reduce likelihood of moisture accumulation. For example, when the temperature difference is less than 10° C. and less than 5° C., a 7% duty cycle for the gate pulse may be provided to the DC bus transistor (Q7) 300.

However, if the temperature difference is greater than the second threshold and less than the first threshold, then the control system 82 may instead provide (process block 716) a second non-zero duty cycle of the gate pulse to the DC bus transistor (Q7) 300. As an example, when the temperature difference is between 5° C. and 10° C., a duty cycle of 4% for the gate pulse is provided to the DC bus transistor (Q7) 300. The appropriate duty cycle may be determined based on the motor temperature that must be maintained to reduce likelihood of moisture condensing on the stator 230 and/or the size of the motor 94 (e.g., 5-10 degrees C.° above ambient temperature). Further, closed loop control by the control system 82 allows an accurate and efficient determination of the appropriate duty cycle of the gate signal that should be sent to the DC bus transistor (Q7) 300. In any case, the DC bus transistor (Q7) 300 receives the appropriate gate pulses that maintain a low DC potential on the DC bus 202A and the appropriate temperature in the motor stator windings 230.

Returning to FIG. 6, after determining that the duty cycle that will maintain the differential temperature, the control system 82 may provide (processor block 604) gate pulse (e.g., control system) with the selected duty cycle to the DC bus transistor (Q7) 300 while the DC second relay (RY2) 302B remains open. Additionally, the control system 82 may switch (process block 606) the inverter 204A to a heating configuration that enable supply of electrical power from the DC bus 202A to motor (e.g., stator) windings 230 during the off-cycle mode. Due to its internal resistance, flowing electrical power through a stator winding 230 may produce heat, thereby increasing temperature of the stator winding 230, which, at least in some instances, may facilitate reducing likelihood of moisture accumulation affecting operational reliability during subsequent operation in the on-cycle mode.

In the heating configuration, three transistors 220 of the inverter 204A may gated at a given time to provide a path for electrical current to flow through the motor windings 230. The three selected inverter transistors 220 may each be on a different phase branch of the inverter 204A to reduce likelihood of formation of a short to ground. By way of example, the first transistors (Q1) 220A, the fourth transistor (Q4) 220D, and the sixth transistor (Q6) 220F may be the selected transistors that are gated such that the first phase path 232A of the motor 94 is positive, and the second phase path 232B and the third phase path 232C of the motor 94 are negative. Such a configuration would draw current into the first phase path 232A connected to the first transistor (Q1) 220A branch and the motor 94 to heat the stator windings 230 connected to the first phase path 232A, such as the third stator winding (winding 3) 230B. This current would dissipate via the second phase path 232B connected to the fourth transistor (Q4) 220D branch and the second stator winding (winding 2) 232C of the motor 94 and the third phase path 232C connected to the sixth transistor (Q6) 220F branch and the first stator winding (winding 1) of motor 94. After an ample amount of time, the control system 82 may gate the remaining transistors, such as the second transistor (Q2) 220B, the third transistor (Q3) 220C, and the first transistor (Q5) 220E to heat the motor windings of the second phase path. The process 600 may continue in a rotational manner to maintain temperature conditions in the motor windings 230 while in the off-cycle mode.

In fact, since an electric motor 94 is expected to remain stationary while in the off-cycle mode, in some embodiments, a set of inverter transistors 220 selected for the heating configuration may also be pulse width modulated. In other words, in such embodiments, the set of inverter transistors 220 may be operated at less than 100% duty cycle, thereby acting as a buck converter to further reduce voltage supplied to the motor windings 230 and, thus, likelihood of the electrical power supplied to the motor windings 230 inadvertently causing the electric motor to actuate during the off-cycle mode.

In the present disclosure, embodiments using silicon-controlled rectifiers (SCRs) are contemplated. In particular, a similar dual-purpose variable speed motor drive 92 may be achieved using silicon-controlled rectifiers in place of or as a replacement for a portion of the diodes (D1-D6) 214. By controlling the gate signals provided to the silicon-controlled rectifiers, the voltage on the DC bus 202A may be varied to meet pre-charging and/or motor heating demands. For example, varying the phase angle of the silicon-controlled rectifiers at which they are fired may vary the DC bus 202A voltage. Additionally, switching the appropriate transistors (Q1-Q6) 220 of the inverter 204A, which may be a combination of IGBTs, MOSFETs, and the like, may allow current to flow through the motor windings 230 to produce motor heat.

However, the present variable speed motor drive 92A presents advantages over a configuration including the silicon-controlled rectifiers. Specifically, the modified variable speed motor drive 92A that is described using diodes 214, which represents a particular embodiment, may reduce the number of control points, and thereby the complexity of operating the variable speed motor drive as a variable speed motor drive during the on-cycles and as a buck converter in the off-cycles. Further, the DC bus transistor (Q7) 300, which also represents a particular embodiment, may be less expensive than and consume less power than the SCRs.

As such, the present disclosure provides techniques for a dual-purpose variable speed motor drive 92A that drives the motor 94 during the on-cycle and acts as a buck converter to heat the motor windings during the off-cycle to reduce or eliminate motor failures caused by reduction of the dielectric strength of the motor winding insulation. Integration of the motor heating functionality with the variable speed motor drive may result in an environmental conditioning system that is more energy efficient, more reliable, and less bulky than counterpart environmental conditioning systems relying on external motor heaters to remove accumulated moisture in the motor windings. By way of example, the rotor of the electric motor 94 in an environmental conditioning system, such as the vapor compression system 72, may be coupled to the compressor 74 such that actuation of the electric motor and, thus, the compressor 74 may drive circulation of the refrigerant through the condenser 76 and evaporator 80 at varying speeds in the on cycle. Similarly, the modified variable speed motor drive 92A provides the capability to function as a buck converter to facilitate heating the motor stator windings 230 during the off-cycle to reduce or eliminate motor failures as a result of moisture or contamination to the windings 230.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A variable speed drive (VSD) configured to drive a motor during an on-cycle and to heat motor windings of the motor during an off-cycle, wherein the variable speed drive comprises:
 a rectifier configured to convert alternative-current (AC) power input to a direct-current (DC) power output;
 a DC bus coupled to the rectifier and comprising a DC bus transistor, wherein the DC bus transistor is configured to:
  pre-charge a DC capacitor of the DC bus to drive the motor during the on-cycles;
  receive a first gate pulse having a first duty cycle in response to temperature differential between a temperature of the motor and an ambient temperature being less than a first threshold during the off-cycle;
  receive a second gate pulse having a second duty cycle in response to the temperature differential being greater than the first threshold during the off-cycle, wherein the second duty cycle is less than the first duty cycle; and
 an inverter comprising a plurality of inverter switches, wherein the inverter is configured to:
  receive the first gate pulse having the first duty cycle or the second gate pulse having the second duty cycle applied to the DC bus transistor; and
  transmit the first gate pulse having the first duty cycle or the second gate pulse having the second duty cycle to one of the motor windings to heat the one of the motor windings and prevent accumulation of moisture on the one of the motor windings.

2. The variable speed drive of claim 1, wherein the temperature differential comprises a temperature difference between a temperature of a stator of the motor and the ambient temperature.

3. The variable speed drive of claim 1, wherein the variable speed drive is configured to operate as a buck converter in response to the DC bus transistor receiving the first gate pulse, and the variable speed drive is configured to operate as the buck converter in response to the DC bus transistor receiving the second gate pulse.

4. The variable speed drive of claim 1, wherein the variable speed drive comprises an inductor located between the DC bus transistor and the plurality of inverter switches and a first relay located between a positive side of the DC bus and a negative side of the DC bus, wherein the first relay is closed and the variable speed drive maintains a low voltage across the DC capacitor of the variable speed drive to operate the variable speed drive as a buck converter.

5. The variable speed drive of claim 1, wherein each of the motor windings is configured to receive power over a respective phase path from the DC bus.

6. The variable speed drive of claim 5, wherein the variable speed drive comprises at least three inverter switches of the plurality of inverter switches to be gated on to provide the respective phase path.

7. The variable speed drive of claim 1, wherein the DC bus further comprises a first relay and a bleed-off resistor, wherein the first relay and the bleed-off resistor are electrically coupled to the DC capacitor in parallel to provide shock protection.

8. The variable speed drive of claim 7, wherein the first relay is closed during the off-cycles to dissipate voltage stored on the DC capacitor.

9. The variable speed drive of claim 7, wherein the DC bus transistor is coupled to a second relay, wherein the second relay is closed in response to the DC bus reaching a predetermined threshold.

10. The variable speed drive of claim 9, wherein the closed second relay results in shorting the DC bus transistor to remove heat loss due to a voltage drop across the variable speed drive.

11. The variable speed drive of claim 9, wherein the DC bus is configured to stop pre-charging of the DC capacitor of the DC bus in response to the DC bus reaching the predetermined threshold.

12. An environmental conditioning system, comprising:
 a motor comprising stator windings;
 a variable speed drive (VSD) configured to drive the motor during an on-cycle and to heat the stator windings during an off-cycle, wherein the variable speed drive comprises:
  a rectifier configured to convert alternative-current (AC) power input to a direct-current (DC) power output;
  a DC bus coupled to the rectifier and comprising a DC bus transistor, wherein the DC bus transistor is configured to:
   pre-charge a DC capacitor of the DC bus to drive the motor during the on-cycle; and
   receive a gate pulse with a duty cycle during the off-cycle, wherein the gate pulse is configured to heat the stator windings; and
  an inverter comprising a plurality of inverter switches, wherein the inverter is configured to:
   receive the gate pulse applied to the DC bus transistor; and
   transmit the gate pulse to one of the stator windings to prevent accumulation of moisture on the one of the stator windings; and
 a controller communicatively coupled to the variable speed drive, wherein the controller is configured to:
  determine a temperature differential between a temperature of the motor and an ambient temperature during the off-cycle;
  compare the temperature differential to a threshold temperature differential;
  determine a value of the duty cycle of the gate pulse based on the comparison of the temperature differential to the threshold temperature differential; and
  provide the gate pulse having the duty cycle with the value to the DC bus transistor during the off-cycle.

13. The environmental conditioning system of claim 12, wherein the temperature differential is determined based on one or more measurements la one or more sensors comprising resistance temperature detectors (RTDs) located on the motor, within the motor, or a combination thereof.

14. The environmental conditioning system of claim 12, wherein the controller is configured to instruct the variable speed drive to pre-charge the DC capacitor until the DC bus reaches a voltage threshold of 85% of a voltage peak value.

15. The environmental conditioning system of claim 12, wherein the DC bus comprises an inductor located between the DC bus transistor and the plurality of inverter switches, and a diode in a reverse biased configuration between a positive side of the DC bus and a negative side of the DC bus to allow the variable speed drive to operate as a buck converter in the off-cycle.

16. The environmental conditioning system of claim 12, wherein the controller is configured to provide a command to close a DC bus relay coupled in parallel with the DC bus transistor in response to the DC bus reaching a predetermined voltage threshold, wherein closing the DC bus relay shorts the DC bus transistor to stop the pre-charging and remove heat loss due to voltage drop across the variable speed drive.

17. The environmental conditioning system of claim 12, wherein the AC power input is a single-phase power supply or a three-phase power supply.

18. A method for driving a motor at various speeds and providing heat to motor windings of the motor, using a variable speed drive, comprising:

pre-charging a DC capacitor of a DC bus of the variable speed drive during an off-cycle using a DC bus transistor, wherein pre-charging the DC capacitor enables driving the motor during an on-cycle, wherein the variable speed drive drives the motor at the various speeds during the on- cycle and provides heat to the motor windings during the off-cycle;

determining a temperature differential between a temperature of the motor and an ambient temperature during the off-cycle;

determining a value of a duty cycle of a gate pulse based on a comparison of the temperature differential with a threshold temperature differential;

providing the gate pulse having the duty cycle with the value to the DC bus transistor during the off-cycle; and transmitting the gate pulse having the duty cycle with the value to the motor windings to heat the motor windings and prevent accumulation of moisture on the motor windings.

19. The environmental conditioning system of claim 12, wherein the threshold temperature differential is a first threshold temperature differential, and the controller is configured to:

compare the temperature differential to a second threshold temperature differential;

select a first value as the value of the duty cycle of the gate pulse based on a determination that the temperature differential is less than the first threshold temperature differential and a determination that the temperature differential is less than the second threshold temperature differential; and select a second value as the value of the duty cycle of the gate pulse based on the determination that the temperature differential is less than the first threshold temperature differential and a determination that the temperature differential is greater than the second threshold temperature differential.

20. The environmental conditioning system of claim 19, wherein the first value is a first percentage, the second value is a second percentage, and the first percentage is greater than the second percentage.

\* \* \* \* \*